Patented Nov. 20, 1951

2,575,518

UNITED STATES PATENT OFFICE 2,575,518

ION EXCHANGE MATERIAL AND USE THEREOF

Eric Leighton Holmes, Northants, and Lucie Evelyn Holmes, Richmond, Surrey, England No Drawing. Application November 30, 1946, Serial No. 713,386. In Great Britain August 30, 1945

Section 1, Public Law 690, August 8, 1946
Patent expires August 30, 1965

9 Claims. (Cl. 210—24)

This invention relates to an improved cation exchange material, the preparation thereof, and the treatment of liquids therewith. More particularly, the invention is concerned with a cation exchange resin capable of treating water containing dissolved salts of both strong and weak acids to remove the cations associated with the weak acids in preference to the cations associated with the strong acids.

When water is softened or conditioned by ordinary cation exchange materials containing exchangeable hydrogen ions, the cations associated in the water with the anions of strong and weak acids are both removed, since the majority of cation exchange materials are not selective in their action. This treatment converts most or all of such salts to their corresponding acids, thus leaving the treated water distinctly acid. Frequently, however, it is desirable to remove or reduce only the temporary hardness of water, the presence of permanent hardness in the treated water being unobjectionable. For example, a water high in bicarbonates or alkalinity may be objectionable for a given use because of the high alkalinity. If such a water is treated with the usual type of cation exchanger regenerated with acid, the cations of both the weak acid salts and strong acid salts are removed so that the effluent is definitely acid. The use of the exchange capacity of the cation exchanger for removing these cations associated with strong acids is therefore wasteful, and, in addition, the acid water usually has to be treated further to remove or neutralize the excess acid in it.

We have found that a cation exchange resin may be prepared which has a selective action and which, when regenerated with acid, will remove the cations of the weak acid salts without having the same effect on the cations of the strong acid salts. By the ordinary use of such a material, a highly alkaline water may have some or all of its alkalinity removed without leaving free mineral acidity in the treated water. This is accomplished in accordance with our invention by using a gel or resin prepared so that it contains acetic acid radicals in a position to be effective for exchange of cations in the treatment of water or other liquids.

We have found that suitable resins or gels for this purpose can be prepared by reacting chloracetic acid, or a salt thereof, under alkaline conditions with the constituents of a phenol-formaldehyde resin or with intermediate condensation products obtained during the preparation of a phenol-formaldehyde resin. Various phenols may be used in the preparation of such a resin and they may be either monohydric or polyhydric phenols. One or more of the well known tannins may also be substituted for part or all of the phenol. We prefer, however, to use ordinary phenol or monohydroxy benzene which gives a resin with a greater exchange capacity than the resins obtained by the use of other phenols such as cresol or the various tannins. However, various mixtures of phenols and mixtures of a phenol and a tannin also give good products.

The following examples are given by way of illustration of the invention:

*Example I.*—5 kilograms of phenol, 5 liters of commercial 40% formaldehyde and ½ kilogram of caustic soda are mixed together and warmed for about thirty minutes. Then, 5 kilograms of chloracetic acid dissolved in 20 liters of 20% caustic soda are added and the mixture warmed for an additional thirty minutes. Two liters of 40% formaldehyde are next added, and the mixture is boiled. The product turns to a colorless gel after boiling for about one hour, and is then dried and broken up into granules. Heating the dried resin at a temperature around 170° C. for fifteen hours produces a resin which is dark brown and relatively insoluble in water. This product is, of course, in the sodium exchanging condition at this stage, and must be treated with a solution of dilute acid to place it in the hydrogen exchanging condition. The capacity of such material for exchanging cations of strong acid salts measured on one convenient scale was found to be 1.5, while its capacity for exchanging the cations of weak acid salts measured on the same scale was found to be 7.5. The corresponding figures for a product prepared from cresol in place of the phenol were found to be 0 for the cations of strong acid salts and 2.0 for the cations of weak acid salts.

*Example II.*—Another product prepared in accordance with this invention by the use of a tannin instead of phenol is made as follows:

5 kilograms of gambier and 2 kilograms of caustic soda are dissolved in 10 liters of water and 5 kilograms of chloracetic acid are added. In this instance, it is desirable to add the chloracetic acid before any formaldehyde is added because of the speed with which the gambier and formaldehyde react. After boiling this mixture for 10 minutes, 10 liters of 40% formaldehyde are slowly added and a gel is formed in about ¾ of an hour, which can be dried at about 120° C. to produce a water insoluble product suitable as a cation exchange material. The relative capacities of such a material in the hydrogen exchanging condition computed on the scale mentioned above was found to be 3.5 for the cations of strong acid salts, and 18.0 for the cations of weak acid salts.

Resins prepared in accordance with this invention are preferably used in the hydrogen exchanging condition for the treatment of water or other liquids. They may be regenerated in the same manner that other hydrogen ion exchangers are regenerated by means of a dilute solution of acid such as sulfuric or hydrochloric acid. Because of the selectivity of their action, however, such materials are particularly useful for removing some or most of the temporary hardness of water without substantially affecting the permanent hardness thereof.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. A granular cation exchange resin comprising a water insoluble reaction product of a salt of chloracetic acid with formaldehyde and a substance selected from the group consisting of phenols and tannins, said product having been treated with a dilute solution of acid to convert it to a hydrogen ion exchanger.

2. A process of treating water containing both bicarbonates and salts of strong acids to reduce the bicarbonates without producing substantial quantities of free mineral acidity in the water which comprises flowing said water through a bed of cation exchange resin containing exchangeable hydrogen, said resin comprising a water insoluble reaction product of a salt of chloracetic acid with formaldehyde and a substance selected from the group consisting of phenols and tannins.

3. A process of treating water containing both bicarbonates and salts of strong acids to reduce the bicarbonates without producing substantial quantities of free mineral acidity in the water which comprises flowing said water through a bed of cation exchange resin containing exchangeable hydrogen, said resin comprising a water insoluble reaction product of a salt of chloracetic acid with formaldehyde and phenol.

4. A process of treating water containing both bicarbonates and salts of strong acids to reduce the bicarbonates without producing substantial quantities of free mineral acidity in the water which comprises flowing said water through a bed of cation exchange resin containing exchangeable hydrogen, said resin comprising a water insoluble reaction product of a salt of chloracetic acid with formaldehyde and cresol.

5. A process of treating water containing both bicarbonates and salts of strong acids to reduce the bicarbonates without producing substantial quantities of free mineral acidity in the water which comprises flowing said water through a bed of cation exchange resin containing exchangeable hydrogen, said resin comprising a water insoluble reaction product of a salt of chloracetic acid with formaldehyde and a tannin.

6. A cation exchange product which comprises a water insoluble phenol-formaldehyde resin in granular form and in the hydrogen exchanging condition prepared by reacting in an alkaline medium at an elevated temperature a salt of chloracetic acid with formaldehyde and a substance selected from the group consisting of phenols and tannins.

7. A cation exchange product as defined in claim 6 in which the substance selected is phenol.

8. A cation exchange product as defined in claim 6 in which the substance selected is cresol.

9. A cation exchange product as defined in claim 6 in which the substance selected is tannin.

ERIC LEIGHTON HOLMES.
LUCIE EVELYN HOLMES.

REFERENCES CITED

The following references are of record in the file of this patent:

UNITED STATES PATENTS

| Number | Name | Date |
|---|---|---|
| 1,805,385 | Voss | May 12, 1931 |
| 2,214,689 | Burrell | Sept. 10, 1940 |
| 2,341,907 | Cheetham | Feb. 15, 1944 |
| 2,354,172 | Myers | July 18, 1844 |
| 2,373,547 | D'Alelio | Apr. 10, 1945 |